United States Patent
Brun et al.

(10) Patent No.: US 9,625,885 B2
(45) Date of Patent: Apr. 18, 2017

(54) APPLICATION-GENERATED FUNCTION BLOCK FOR DATA EXCHANGE BETWEEN CONTROL PROGRAMS AND BUILDING AUTOMATION OBJECTS

(75) Inventors: Gerhard Brun, Lucerne (CH); Herbert Meier, Baar (CH); David E. Bornside, Palatine, IL (US); Diego Madone, Hombrechtikon (CH)

(73) Assignee: Siemens Schweiz AG, Zurich (CH)

( * ) Notice: Subject to any disclaimer, the term of this patent is extended or adjusted under 35 U.S.C. 154(b) by 631 days.

(21) Appl. No.: 13/432,427

(22) Filed: Mar. 28, 2012

(65) Prior Publication Data

US 2013/0085719 A1    Apr. 4, 2013

(30) Foreign Application Priority Data

Oct. 3, 2011   (EP) .................................... 11183684

(51) Int. Cl.
| | | |
|---|---|---|
| *G06F 17/50* | (2006.01) | |
| *G05B 15/02* | (2006.01) | |
| *G06F 9/44* | (2006.01) | |
| *H04L 12/28* | (2006.01) | |

(52) U.S. Cl.
CPC ............... *G05B 15/02* (2013.01); *G06F 8/24* (2013.01); *G05B 2219/23255* (2013.01); *G05B 2219/2614* (2013.01); *G05B 2219/2642* (2013.01); *H04L 2012/285* (2013.01)

(58) Field of Classification Search
CPC ............ G05B 15/02; G05B 2219/2642; G05B 2219/23255; G05B 13/02
USPC .............................................................. 703/1
See application file for complete search history.

(56) References Cited

U.S. PATENT DOCUMENTS

| | | | |
|---|---|---|---|
| 7,548,833 B2 * | 6/2009 | Ahmed ......................... | 702/188 |
| 2005/0289467 A1 | 12/2005 | Imhof | |
| 2007/0055759 A1 * | 3/2007 | McCoy et al. ................ | 709/223 |
| 2011/0071685 A1 * | 3/2011 | Huneycutt et al. ........... | 700/275 |
| 2011/0087650 A1 * | 4/2011 | Mackay et al. ............... | 707/722 |

OTHER PUBLICATIONS

PCT Searching Authority Communication dated Jan. 4, 2013, for PCT Application No. PCT/EP2012/069390.

* cited by examiner

*Primary Examiner* — Aniss Chad

(57) ABSTRACT

A system, process, and method for modeling a building automation system is provided that permits a control program to easily and efficiently add field devices, gather data from, and provide data to field devices, iterate though all field devices in a hierarchical structure, poll the field devices, evaluate the results, and react accordingly.

20 Claims, 5 Drawing Sheets

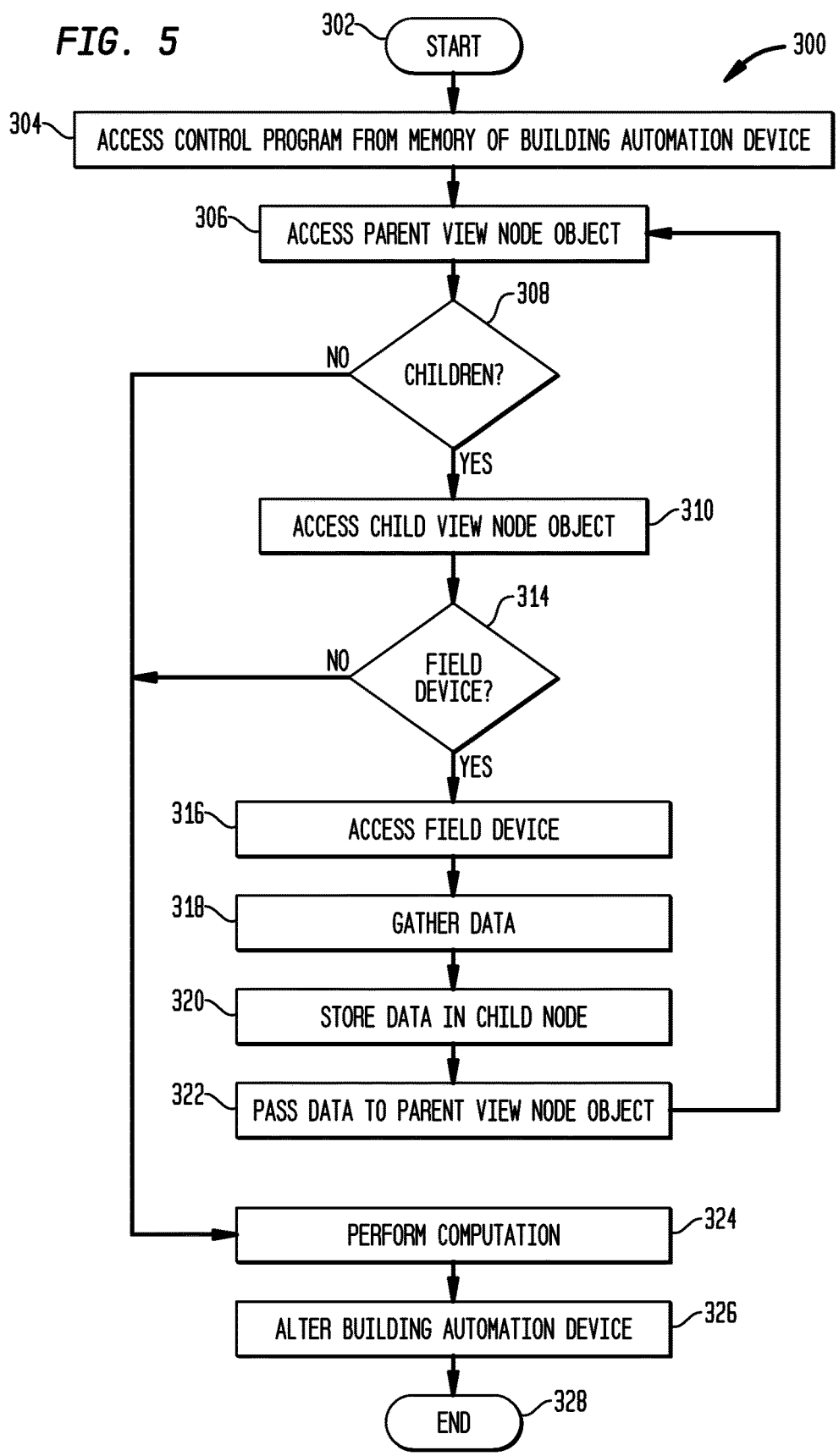

APPLICATION-GENERATED FUNCTION BLOCK FOR DATA EXCHANGE BETWEEN CONTROL PROGRAMS AND BUILDING AUTOMATION OBJECTS

CROSS REFERENCE TO RELATED APPLICATIONS

This patent document claims priority under 35 U.S.C. §119 and all other benefits permitted by law from European Patent Application No. 11183684.7, titled "Struktur and Verhalten eines Gebäudeautomationssystems," (Structure and Behavior of a Building Automation System) filed Oct. 3, 2011, the content of which is hereby incorporated by reference in its entirety to the extent permitted by law.

The subject matter of this application is additionally related to the subject matter in the following co-pending U.S. patent applications each by one or more of the same inventors as the present application and filed on the same day as the present application and commonly assigned herewith to Siemens AG:

Non-provisional, U.S. patent application Ser. No. 13/432,417, titled "System And Method For Automatically Naming Objects In A Building Automation System," filed on Mar. 28, 2012;

Provisional, U.S. Patent Application No. 61/617,008, titled "System, Method and Apparatus for Grouping Building Automation Objects for Group Communication Within a Building Automation System," filed on Mar. 28, 2012; and Provisional, U.S. Patent Application No. 61/617,020, titled "System, Method and Apparatus for Grouping Building Automation Objects for Group Communication With a Central Control Application Within a Building Automation System," filed on Mar. 28, 2012;

Each of these additional related applications are incorporated herein by reference in its entirety to the extent permitted by law.

TECHNICAL FIELD

The present invention generally relates to building systems and, more particularly, to systems, processes, and methods for efficiently communicating with a plurality of building automation objects, including but not limited to field devices, in a hierarchal structure.

BACKGROUND

A building automation system is an arrangement for monitoring, open-loop control and/or closed-loop control of process variables in complex technical systems in a building, or in a campus comprising a number of buildings. A building automation system typically operates heating, ventilation and air-conditioning systems, lighting and shading devices and also access control, security and fire surveillance systems. In the building automation system process variables—such as room air conditioning variables or events for example—are detected, evaluated, monitored, influenced or generated, with the energy consumption of the building or campus also advantageously being optimized by the building automation system.

Generally, a building automation system encompasses and operates a plurality of what are known as field devices, such as sensors and actuators. Examples of typical field devices are temperature and humidity sensors, air quality sensors, pressure sensors, flow meters, electricity meters, heat meters, brightness sensors, fire alarms, intrusion alarms, alarm or sprinkler devices, drives for hot water valves, thermostat valves, ventilation flaps or blinds, light switches, smart card readers or devices for detecting biometric data. The building automation system typically comprises a plurality of software modules, processes or programs, and in general a number of computers or processors for their activation and also as a rule a plurality of open-loop and closed-loop control devices as well as further devices, for example devices for linking the building automation system to external communication networks, screens of devices for analysis of video signals.

The elements (objects or field devices) of a building automation system are widely dispersed throughout a facility. For example, an HVAC system includes temperature sensors and ventilation damper controls as well as other elements that are located in virtually every area of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building automation system operation, there is a need to monitor the operation of, and often communicate with, the various dispersed elements of a building automation system.

Electrical or wireless communication media are used in a building automation system for the exchange of data of individual devices or parts of systems, as a rule a number of communication networks exist, with cables, optical data communication channels, ultrasound connections, electromagnetic near fields or radio networks able to be used, including fiber optic networks or cellular networks for example. Examples of technologies or standards able to be used for the said data exchange are BACnet, LON or LonWorks® from the company ECHELON, the European Installation bus EIB, KONNEX, ZigBee or PROFIBUS defined by German standard DIN 19245.

Building automation systems typically have one or more centralized control stations in which data from each of the elements in the system may be monitored and in which various aspects of system operation may be controlled and/or monitored. The control station typically includes a computer having processing equipment, data storage equipment, and a user interface. To allow for monitoring and control of the dispersed control system elements, building automation systems often employ multi-level communication networks to communicate operational and/or alarm information between operating elements, such as sensors and actuators, and the centralized control station.

One example of a building automation system control station is the APOGEE® INSIGHT® Workstation, available from Siemens Industry, Inc. of Buffalo Grove, Ill., which may be used with the model APOGEE® building automation system, also available from Siemens Industry, Inc. (APOGEE and INSIGHT are U.S. federally registered trademarks of Siemens Industry, Inc.) In this system, several control stations, connected via an Ethernet or another type of network, may be distributed throughout one or more building locations, each having the ability to monitor and control system operation. As a consequence, different people in different locations of the facility may monitor and control building operations.

The typical building automation system (including those utilizing the APOGEE® Insight® Workstation) has a plurality of field panels and/or controllers that are in communication with a workstation. In addition, the building automation system also includes one or more field devices connected to the field panels and/or controllers. Each field device is typically operative to measure and/or monitor various building automation system parameters. In particular, each field device may include one or more sensors and/or actuators to measure and/or monitor corresponding "points" within the respective building and/or building automation system, As referenced herein, a "point" may be (i) any physical input or output to or from a respective controller, field device, sensor or actuator, or (ii) any virtual point associated with a control application or logic object within a controller or field panel that is measured, monitored or controlled. While the workstation is generally used to make modifications and/or changes to one or more of the various components of the building automation system, a field panel may also be operative to enable certain modifications and/or changes to one or more parameters of the system. This typically includes parameters such as a temperature set point or other set points in a field device controller or directly in a field device. In addition, the workstation may be configured to modify a control program or the like in a field panel for controlling a field device.

To this end, addressing of semantic information units of field devices is defined directly in a closed-loop or open-loop control program. Thus BACnet input, output and value objects are typically addressed directly in a program. If a number of identical or similar applications are present in a building automation system, for example a number of room temperature closed-loop control programs, the individual programs must be adapted to the field devices. However, determining how devices are related in a building automation system is often times difficult and inefficient given the sheer number of field devices typically present in large business automation systems. Moreover, control programs when written are customized for the specific number of inputs of field devices making the process inefficient for adding additional field inputs when a technician is in the field.

BRIEF SUMMARY

In a first aspect, a method for exchanging data between a control program and one or more building automation devices is provided. The method includes providing a building automation device in communication with a control program; providing a building automation model including one or more parent view node objects and one or more child view node objects, wherein at least one of the one or more parent view node objects is logically linked to the building automation device and the one or more child view node objects, and wherein the one or more child view node objects are logically linked to one or more field devices.

In a second aspect, a system for representing a hierarchal structure representing one or more building automation devices and one or more field devices is provided. The system includes a building automation model including a parent view node object logically linked to a child view node object, wherein the parent view node object includes a list of semantic information units, wherein one of the list of semantic information units is logically linked to the child view node object, and wherein the child view node object is logically linked to a field device.

In a third aspect, a computer readable storage medium having stored therein data representing instructions executable by a programmed processor for iterating through a hierarchal structure representing one or more building automation devices and one or more field devices is provided. The storage medium including instructions for accessing a parent view node object; determining if the parent view node object is logically linked to one or more child view node objects; wherein the parent view node object includes a list of semantic information units logically linked to the one or more child view node objects; and wherein the one or more child view node objects includes a list of semantic information units logically linked to one or more field objects.

BRIEF DESCRIPTION OF THE SEVERAL
VIEWS OF THE DRAWINGS

The embodiments will be further described in connection with the attached drawing figures. It is intended that the drawings included as a part of this specification be illustrative of the exemplary embodiments and should in no way be considered as a limitation on the scope of the invention. Indeed, the present disclosure specifically contemplates other embodiments not illustrated but intended to be included in the claims. Moreover, it is understood that the figures are not necessarily drawn to scale.

Figure 4:
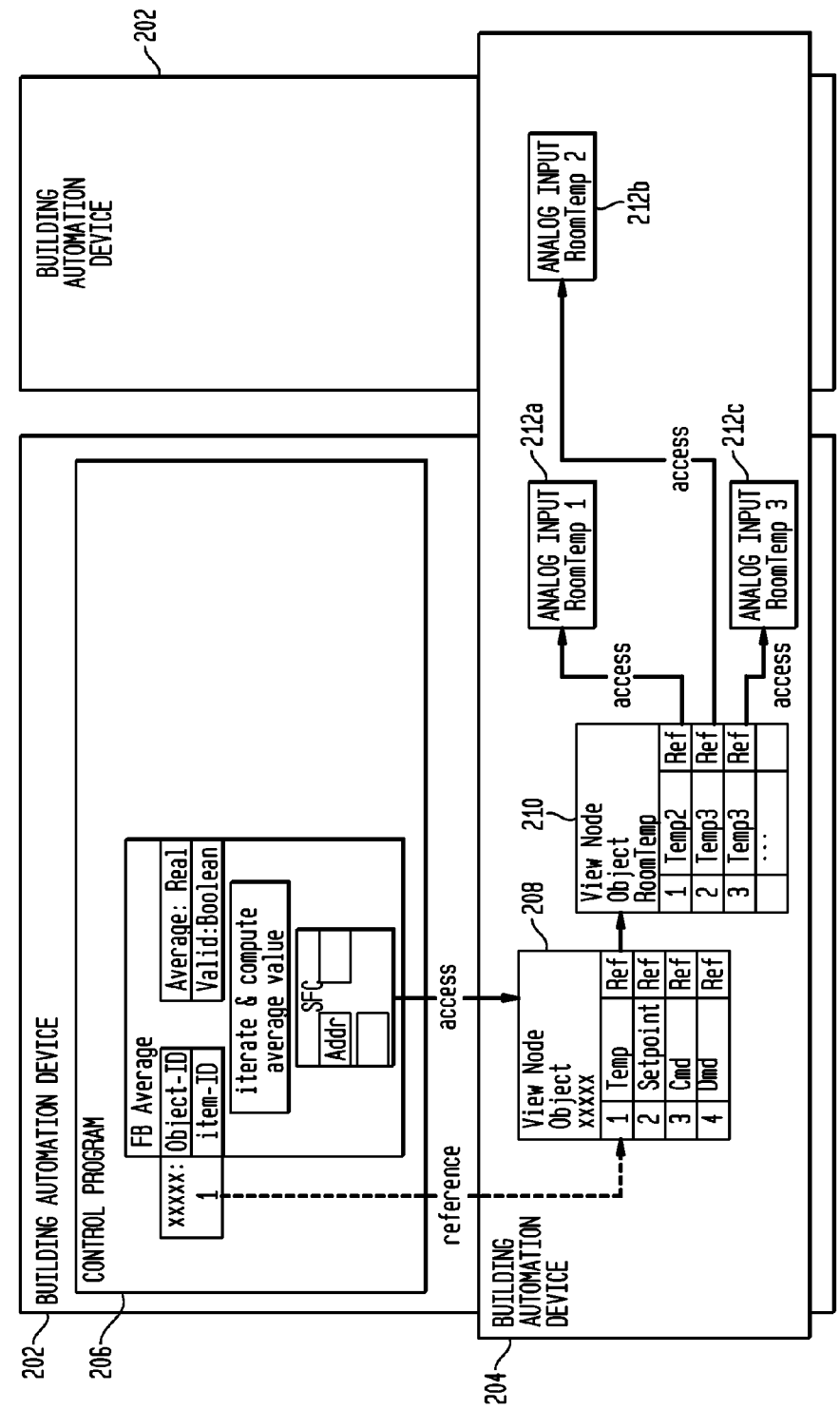

FIG. 4 illustrates another functional block diagram of a building automation system for controlling and/or monitoring inputs and outputs of field devices (or other points associated therewith) employed in a building based on a building automation model collectively implemented by building automation devices; and FIG. 5 illustrates a method for a control program to iterate through a hierarchal building automation model such as that illustrated herein and equivalents thereto.

DETAILED DESCRIPTION OF PRESENTLY
PREFERRED EMBODIMENTS

The exemplary embodiments provided are illustrative. The present invention is not limited to those embodiments described herein, but rather, the disclosure includes all equivalents. The systems, processes, and methods can be used in any field benefiting from dynamic configurable controllers.

Unless otherwise defined, all technical and scientific terms used herein have the same meaning as commonly understood by one of ordinary skill in the art. In case of conflict, the present document, including definitions, will control. Preferred methods and materials are described below, although apparatuses, methods, and materials similar or equivalent to those described herein can be used in practice or testing. All publications, patent applications, patents and other references cited herein are incorporated by reference in their entirety to the extent permitted by law. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

A more detailed description of the embodiments will now be given with reference to FIGS. 1-5. Throughout the disclosure, like reference numerals and letters refer to like elements. The present disclosure is not limited to the embodiments illustrated; to the contrary, the present disclosure specifically contemplates other embodiments not illustrated but intended to be included in the claims.

Because determining how devices are related in a building automation system is often times difficult and inefficient given the sheer number of field devices typically present in large business automation systems, and that control programs when written are customized for the specific number of inputs of field devices making the process inefficient for adding additional field inputs when a technician is in the field, what is needed a system and method to provide for an application-generated function block for data exchange between control programs and building automation objects, such as BACnet objects, to provide for the addition of an unknown number of field devices in a hierarchal structure without a programmer having to make adaptations to the program code of the open-loop and/or closed-loop control program to provide a standardized representation of multiply sensed and actuated values.

Figure 1:
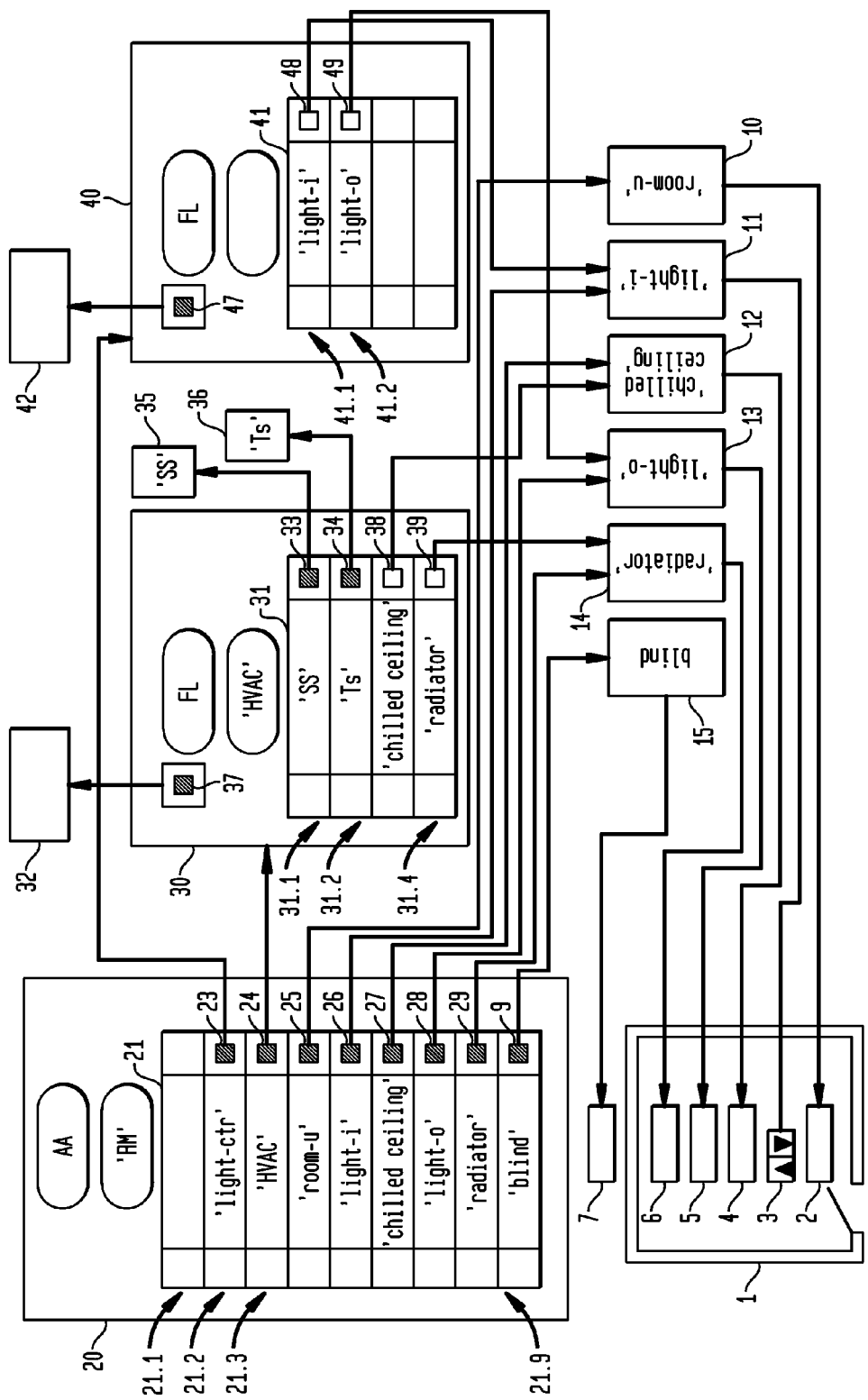
FIG. 1 illustrates a functional block diagram of a structure of a building automation system for operating a section of a building.

FIG. 1 illustrates a room 1 of a building section able to be operated by a building automation system by controlling and/or monitoring field devices therein. Assigned to the room 1 are a number of field devices, by the use of which for example a desired comfort for users and a required safety for users and infrastructure with optimized operating costs are able to be achieved. Typically assigned to the room 1 are a room unit 2, a light switch 3, an air conditioning register 4, a heating element 5, a heating register 6 and a blind drive 7, although other configurations are contemplated. The room unit 2 serves as the user interface to the building automation system, including but not limited to, to enter a nominal room temperature range and to display the current room temperature as well as to display an order of magnitude of the costs of the energy consumed by the room 1.

The devices operated in the room 1 are advantageously modeled in the software of the building automation system as far as is necessary and corresponding models are preferably implemented using an object-oriented approach. Typically the models are connected via input/output modules (or building automation objects, also referred to as BA objects) to field devices. For example the room unit 2 is mapped by a room unit model (or BA object) 10, the light switch 3 by a light switch model (or BA object) 11, the air conditioning register 4 by an air conditioning register model (or BA object) 12, the lighting element 5 by a lighting element model 13, the heating register 6 by a heating register model (or BA object) 14 and the blind drive 7 by a blind drive model (or BA object) 15 in the building automation system.

An overview of the totality of the functionality of the automation functions available for the room 1 is stored in a first overview node 20 (also referred to as parent view node object). The first overview node 20 is an object of the building automation system and features an overview list (also referred to as a view node item list) 21, which has at least one semantic information unit. The semantic information unit identifies an automation function, which is provided in the room 1 represented by the first overview node 20. Advantageously the semantic information unit contains at least one identifier suitable for identification and a relation to the automation function involved. The name is advantageously a string data type with a fixed or variable length. A collection of semantic information units (also referred to a view node item list) may include a logically linked list of semantic information units to one or more parent or child nodes.

A specific relationship between two nodes or objects of the building automation system is designated in this text by the term relation such that they form one or more parent-child relationships. The relation has a predefined type range which comprises at least two different relation types. In the present case what is known as a contacts (or connects) relation and what is known as "an owns" relation are defined or a logically linked/connected relationship. The contacts relation is identical here to the relation with the value "contacts" and means here that this relation is implemented such that the relation is suitable for a bidirectional data exchange between the nodes or objects concerned. The owns relation is identical here to the relation with the value "owns" and means here that this relation is implemented such that the relation is suitable one the one hand for a bidirectional data exchange between the nodes or objects concerned, on the other hand nodes or objects with the owns relation are advantageously existentially linked to one another such that they can only be copied, moved and deleted together, by an engineering tool for example.

In the present exemplary embodiment the overview list 21 has space for nine semantic information units 21.1 to 21.9 together forming a collection of semantic information units (also referred to as a view node item list).

A semantic information unit 21.3 able to be identified by the identifier "HVAC"—i.e. heating, ventilation and air conditioning—has an owns relation 24, which applies between the first overview node 20 (also referred to as a parent view node object) and a second overview node 30 (also referred to as a child view node object).

A semantic information unit 21.2 able to be identified by the identifier "light-ctr"—i.e. light control—has an owns relation 23, which applies between the first overview node 20 and a third overview node 40 (also referred to as a child view node object).

A semantic information unit 21.4 able to be identified by an identifier "room-u"—i.e. room unit—has an owns relation 25, which applies between the first overview node 20 and the room unit model 10.

A semantic information unit able to be identified by an identifier "light-i"—i.e. light input—has an owns relation 26, which applies between the first overview node 20 and the light switch model 11.

A semantic information unit able to be identified by an identifier "chilled ceiling" has an owns relation 27, which applies between the first overview node 20 and the air conditioning register model 12.

A semantic information unit able to be identified by an identifier "light-o"—i.e. light output—has an owns relation 28, which applies between the first overview node 20 and the illumination element model 13.

A semantic information unit able to be identified by an identifier "radiator" has an owns relation 29 which applies between the first overview node 20 and the air conditioning register model 14.

Finally a semantic information unit able to be identified by an identifier "blind" has its own relation 9, which applies between the first overview node 20 and the blind drive model 15.

An overview of an automation functionality designated "HVAC"—i.e. heating, ventilation and air conditioning, is stored in the second overview node 30. The second overview node 30 is an object of the building automation system and has an overview list 31 for storage of semantic information units 31.1 to 31.4 (also referred to as a view node item list).

A semantic information unit 31.1 able to be identified by an identifier "SS"—i.e. status—has an owns relation 33, which applies between the second overview node 30 and a first variable 35 advantageously implemented as an object, in which for example current information on the operating state of the automation functionality "HVAC" is able to be stored.

A semantic information unit 31.2 able to be identified by an identifier "Ts"—i.e. temperature setpoint value—has an owns relation 34, which applies between the second overview node 30 and a second variable 36 advantageously implemented as an object, in which for example the temperature setpoint value "Ts" applicable for the automation functionality "HVAC" is able to be stored.

A semantic information unit 31.3 able to be identified by an identifier "chilled ceiling" has a contacts relation 38, which applies between the second overview node 30 and the air conditioning register model 12.

A semantic information unit able to be identified by an identifier "radiator" has a contacts relation 39, which applies between the second overview node 30 and the heating register model 14.

The second overview node 30 has a further an owns relation 37, which applies between the second overview node 30 and an open-loop and/or closed-loop control program 32. The automation function required for heating, ventilation and air conditioning of the building section is programmed in the open-loop and/or closed-loop control program 32. The open-loop and/or closed-loop control program 32, the second overview node 30 and the further objects 35 and 36, linked by an owns relations to the overview node 30, form a functional unit through the said an owns relation 37. Through the action option of the available relations an access for reading and writing of data between the open-loop and/or closed-loop control program 32 on the one hand and objects connected via relations with the overview node 30 on the other hand is made possible indirectly via the overview node 30. The described structure of the functional unit makes it possible for field devices to be incorporated into and replaced in the building automation system without program code in the open-loop and/or closed-loop control program 32 concerned having to be adapted for this purpose.

An overview of an automation functionality designated by "light-ctrl"—i.e. light control—is stored in the third overview node 40. The third overview node 40 is an object of the building automation system and has an overview list 41 for storing semantic information units 41.1 to 41.4.

A semantic information unit 41.1 able to be identified by an identifier "light-i"—i.e. light input—has a contacts relation 38, which applies between the third overview node 40 and the light switch model 11.

A semantic information unit 41.2 able to be identified by an identifier "light-o"—i.e. light output—has a contacts relation 39, which applies between the third overview node 40 and the illumination element model 13.

The third overview node 40 has an owns relation 47, which applies between the third overview node 40 and an open-loop and/or closed-loop control program 42. The automation function required for light control in the assigned building section is programmed in the open-loop and/or closed-loop control program 42. The open-loop and/or closed-loop control program 42 and the third overview node 40 form one functional unit through the said owns relation 47. The opportunity of the available relations to have an effect makes possible access for reading and writing of data, between the open-loop and/or closed-loop control program 42 on the one hand and objects connected via relations with the third overview node 40 on the other hand, indirectly via the overview node 40. The described structure of the functional unit makes possible the inclusion and replacement of field devices into the building automation system, without program code in the open-loop and/or closed-loop control program 42 concerned having to be adapted for this purpose.

The semantic information units stored in the overview list 21, 31 or 41 are advantageously able to be identified via predefined or standardized designations. This enables operator views, for a control center or management system of the building automation system for example, to be generated in a user-friendly manner and with relatively little effort. By using predefined designations by means of the string data type for the semantic information units a currently-installed building automation system is able to be documented with relatively little effort.

In an embodiment variant of the overview node 20, 30 or 40, the overview list 21, 31 or 41 is ordered or sorted in accordance with certain rules.

Advantageously device models will be provided with a designation which is able to be evaluated on generation or checking of a relation. If for example, as shown in FIG. 1, the semantic information unit 21.9 of the overview list 21 1 assigned to the room 1 is identified by the character string "blind" and also the corresponding blind drive model 15 is marked with the same identifier, the generation or checking of the owns relation 9 will be simplified and able to be automated.

By using a marking with the data type character string or string in a device model, an automatic linkage of the device model to the associated function unit via the corresponding overview node is made possible without program code having to be modified in the assigned open-loop or closed loop control program.

In accordance with the structure of the building the building sections to be operated by the building automation system are typically divided into rooms with—under some circumstances—very different requirements, or by a grid with grid elements with similar or identical requirements. Overview nodes are advantageously used in advantageous modeling of rooms and grid elements. Grid elements are typically produced by an arrangement of support structures or window structures in the building section. Flexible modeling of the building is achieved by the use of two different types of overview node, a first type for a room and a second type for grid elements. Overview nodes of the type designed for a room are typically labeled "RM", i.e. room, in the drawing, overview nodes of the type designed for grid elements are labeled "GD", i.e. grid or grid element. The overview node 20 shown in FIG. 1 for room 1 is accordingly of type "RM". Overview nodes of type "GD" can be linked dynamically to an overview node of type "RM".

Figure 2:
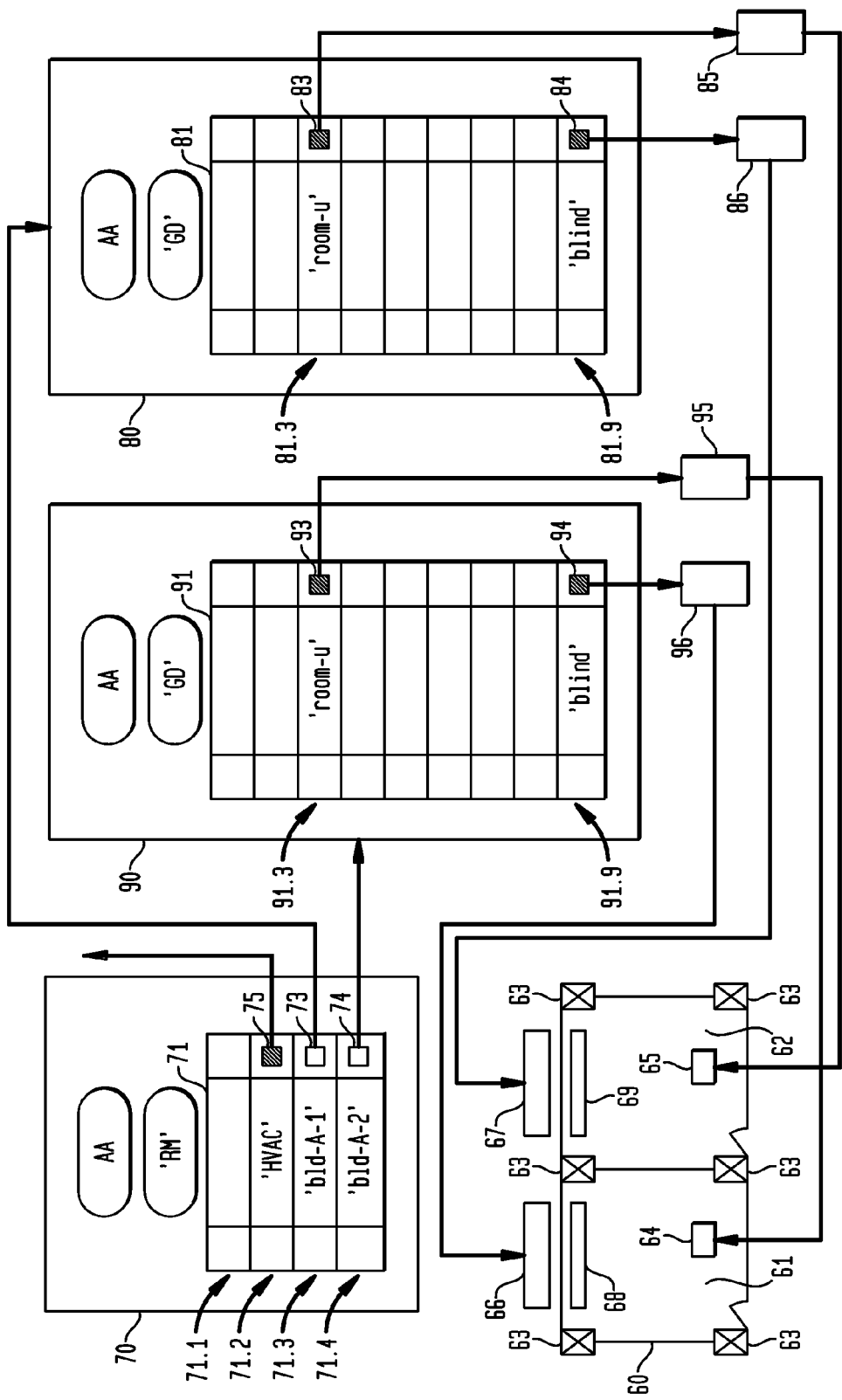
FIG. 2 illustrates a functional diagram for modeling a further building section, having a number of rooms or zones, able to be operated by the building automation system.

In FIG. 2 a building section divided into the grid is labeled 60, having a first grid element 62 and a second grid element 61. The grid structure of the building section 60 is provided here by support structures 63 for example. The devices assigned to the two grid elements 62 and 61 are reduced here to a minimum for the sake of simplification, since only the principle of the advantageous modeling is to be presented. Grid element 62 or 61 thus comprises a room unit 65 or 64, a heating register 69 or 68, and a blind drive 67 or 66.

The devices operating the grid element 62 or 61 are advantageously modeled in the software of the building automation system as far as necessary and corresponding models are advantageously implemented using an object-oriented approach. The models are typically connected via input/output modules to the field devices. For example the room unit 65 or 64 will be mapped by room unit model 85 or 95 respectively and the blind drive 67 or 66 by a blind drive model 86 or 96 respectively in the building automation system.

A fourth overview node (as referred to as a parent view node object) 70 of type "RM", i.e. room, describes the building section 60 which comprises the two grid elements 62 or 61 respectively. The fourth overview node 70 has an overview list 71 for storage of semantic information units 71.1, 71.2, 71.3 and 71.4 which may be logically linked to one or more child view node objects (such as child view node objects 80, 90). A semantic information unit 71.2 able to be identified by the identifier "HVAC"—i.e. heating, ventilation and air conditioning—has an owns relation 75, which is between the fourth overview node 70 and a functional unit is not shown in the diagram, through which for example the heating, ventilation and air conditioning functionality is guaranteed to the entire building section. Furthermore the overview list 71 comprises a semantic unit 71.3 able to be identified with the identifier "bld-A-1" and a semantic unit 71.4 able to be identified with the identifier "bld-A-2".

A current grid division of the building section 60 is stored by means of semantic information units of the overview list 71. The semantic information unit 71.3 has a contacts relation 73 which applies between the fourth overview node 70 describing the building section 60 and a fifth overview node 80. The semantic information unit 71.4 has a contacts relation 74 which applies between the fourth overview node 70 and a sixth overview node 90.

The fifth overview node 80 and the six overview node 90 of type "GD", i.e. grid or grid element. In accordance with the first overview node 20 in FIG. 1, which describes the totality of the automation functions specifically available for the room 1, the totality of the automation functions specifically available for the first grid element 62 is listed in the fifth overview node 80, and the totality of the automation functions specifically available for the second grid element 61 in the sixth overview node 90. Semantic information relating to the first grid element 62 is stored in the overview list 81 in the fifth overview node 89. Correspondingly semantic information relating to the second grid element 61 is stored in the overview list 91 in the sixth overview node 90.

The structure and the method of operation which are made possible by the overview nodes (also referred to as the view node objects), overview lists (also referred to as the view node item list), relations and functional units in particular produce the following advantages in the engineering, commissioning and maintenance phases: Nodes are able to be copied during engineering, relations are able to be checked with the aid of suitable identifiers by an engineering tool or at runtime automatically, field devices, grids and scope of the available functionality of building sections are able to be changed without modifications having to be made to the program code of open-loop and/or closed-loop control programs since the closed-loop and or open-loop control programs access field devices directly via overview nodes.

Figure 3:
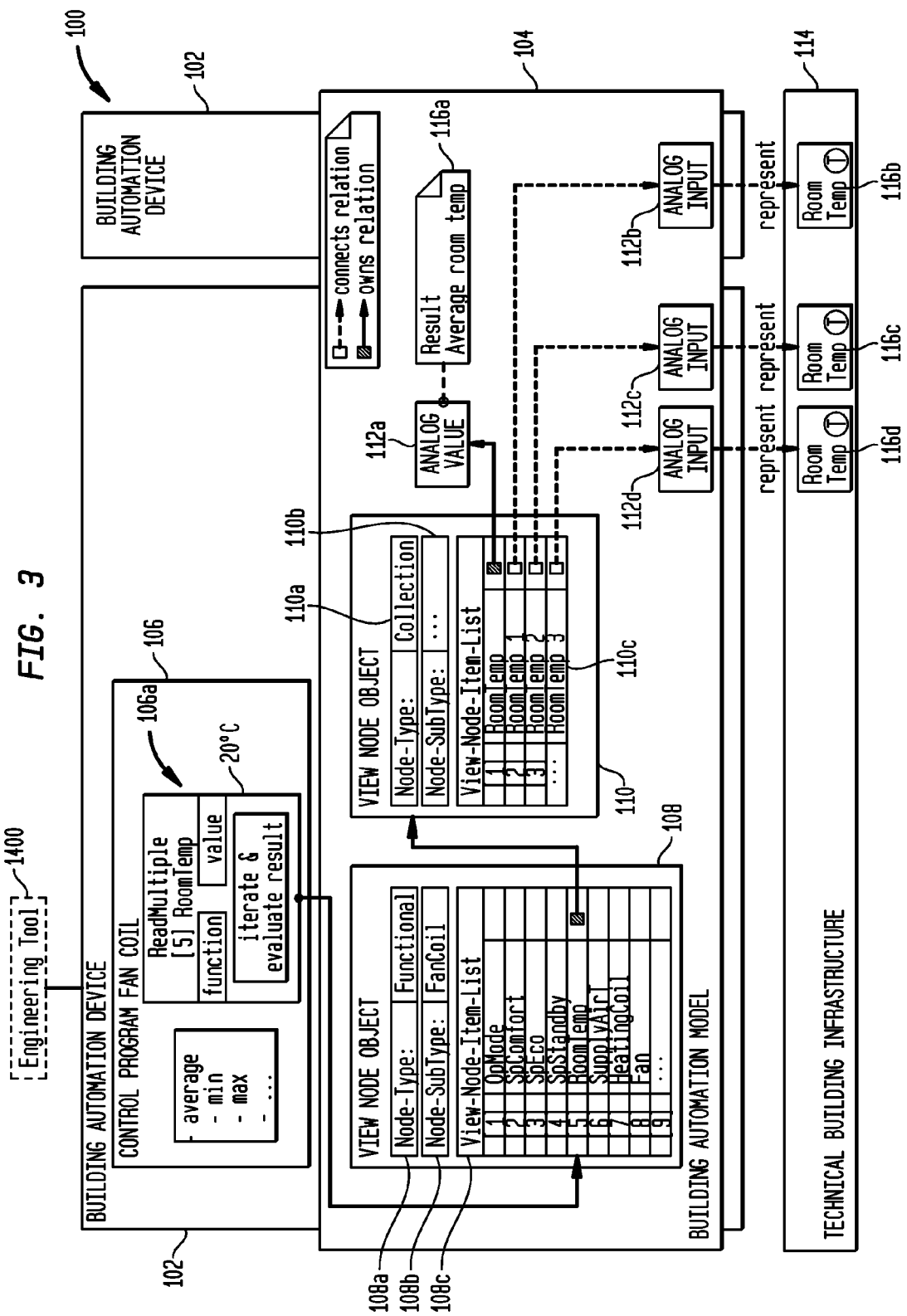
FIG. 3 illustrates a functional block diagram of a building automation system for controlling and/or monitoring inputs and outputs of field devices (or other points associated therewith) employed in a building based on a building automation model collectively implemented by building automation devices.

FIG. 3 illustrates a functional block diagram of a building automation system 100 for controlling and/or monitoring inputs and outputs of field devices (or other points associated therewith) employed in a building based on a building automation model collectively implemented by building automation devices. FIG. 3 also illustrates engineering tool 1400 for initially configuring or commissioning the building automation devices and logically linked lists for the view node objects to be employed in each building automation device. A graphical user interface may be configured to interface with the system or engineering tool so as to configure and commission a building automation model for implementation in building automation devices as illustrated.

Building automation system 100 includes one or more building automation devices 102. As illustrated in FIG. 3, one of the one or more building automation devices 102 may control, interface with, or monitor devices such as fan coil by implementing a control program 106 and one or more functional program routines 106a for adjusting the temperature based in part on the average room temperature 116a collected from one or more room temperature sensors 116b-116d. Building automation device 102, includes processing circuitry/logic configured to access and execute a control program 106 and one or more functional program routines 106a that are stored in memory (such as random access memory, cache memory or other volatile memory storage device or computer readable media) or secondary storage (such as read only memory, non-volatile flash memory, hard drive, memory stick or other non-volatile memory storage device or computer readable media). Control program 106 may be a separate program or a program module of building automation device 102, and it may include an operating system (such as Linux or other conventional operating system).

Control program 106 instructs and interacts with a hierarchy of sensors, such as temperature sensors 116b-116d, throughout building automation model 104 represented as a plurality of view node objects (also referred to as overview nodes) configured in a hierarchal structure, such as one or more view node object parents 108 and one or more view node object children 110, to transmit and collect data to and from one or more sensors or actuators 116db-116d to compute a resulting value 116a of all the aggregated view node objects 108, 110.

Building automation model 104 permits control program 106 to easily and efficiently add field devices, gather data from, and provide data to field devices (such as one or more room sensors 116b-116d, actuators, or combinations thereof), iterate though all field devices in the hierarchy, poll the field devices, evaluate the results, and react accordingly. No longer is the system taxed with determining how numerous field devices are related to building automation device 102. Building automation model 104 is configured by technician to logically link any number of field devices of technical building infrastructure 114 to view node objects 108, 110 such that building automation device 102 can quickly, efficiently, and effectively communicate with any number of field devices.

For example and still referring to FIG. 3, control program 106 executes instructions to iterate and evaluate parent view node object 108. Parent view node object 108 includes node type 108a which provides data describing the type of node illustrated in building automation model 104. For example, node type includes but is not limited to, functional (representing that the view node represents the interface of a function, including but not limited to a control program), collection (representing that the view node represents an interface of a collection of sensors or actuators), room (representing that the view node represents an interface of all information entities of a room); room-grid (representing that the view node represents an interface of all information entities of a room segment); network (representing that the view node represents an interface of all information entities of a field bus); and device (representing that the view node represents an interface of all information entities of networked peripheral devices). More or less node types are contemplated.

View node object 108 also includes node-subtype 108b which further describes the type of object linked to the view node object 108. As illustrated in FIG. 3, node-subtype 108b lists "FanCoil" representing that view node object 108 is logically linked to building automation device 102. View node object 108 also includes a view-node-item-list (also referred to as a collection of semantic information units) 108c containing a representation of one or more semantic information units related to the object. For example, as illustrated here, view node object 108 includes item list 108c containing values indicative of semantic information units, including but not limited to, [1] OpMode (representing the object's mode of operation); [2] SpComfort (representing the set point comfortable temperature); [3] SpEco (representing the set point economical temperature); [4] SpStandby (representing the set point standby temperature); [5] RoomTemp (representing the room temperature), [6] SupplyAirT (representing the supply air temperature); [7] HeatingCoil (representing the heating coil temperature); [8] Fan (representing the fan's mode of operation). Other configurations are contemplated and the inclusion of more or less semantic information units is contemplated. For example, information from any type of function may be represented using the system, processes, and methods described, including but not limited to, fan coil, variable air volume devices (VAV), and chilled ceiling fans.

Each of the items contained within view node item list 108c optionally may be logically linked/connected to a hierarchy of one or more child view node objects which are optionally logically linked/connected to one or more field devices (including but not limited to, room sensors, actuators, or combinations thereof).

Here, [5] RoomTemp is logically linked to child view node object 110. Like parent view node object 108, child view node object 110 includes node type 110a (similar to node type 108a) and node-subtype 110b (similar to node-subtype 108b). Also included in child view node object 110 is view-node-item-list 110c including a logically linked list of one or more related semantic information units linked to one or more field devices (illustrated herein as sensors 116b-116d but other types and combinations of fields devices are contemplated). For example, view-node-item-list 110c includes [1] RoomTemp (representing the average room temperature); [2] RoomTemp 1 (representing the temperature retrieved from analog input 112b from room sensor 116b); [3] RoomTemp 2 (representing the temperature retrieved from analog input 112c from room sensor 116c); RoomTemp 3 (representing the temperature retrieved from analog input 112d from room sensor 116d). Other configurations are contemplated and the inclusion of more or less semantic information units is contemplated. For example, information from any type of function may be represented using the system, processes, and methods described, including but not limited to, communicating whether one or more windows are open or the presence or absence of detectors. Moreover, other use of data is contemplated including use of any number of semantic information units to determine the minimum, maximum, logical OR, logical AND, and any other mathematical function (such as determining an average, median, mean, mode, range, minimum, maximum, or performing any known mathematical function on the data by means of computation including but not limited to, addition, subtraction, multiplication, division, or any combination thereof).

Thus, as illustrated in FIG. 3, the value of [1] RoomTemp of child view node object 110 is determined by collecting the temperatures from multiple sensors (e.g., 116b-116d), averaging those values 116a and storing analog data 112a in view-node-item-list 110c. That data can then be passed to parent view node object 108. Other configurations of data are contemplated. For example, a member of view-node-item-list may be used independently or in conjunction with data retrieved from one or more field devices, one or more child view node objects, or combination thereof.

Thus, building automation model achieves the independency of control program 106 from the number of field devices (including but not limited to sensors 116b-116d, actuators, or combinations thereof) used in a project. Within the control program 106, an application-oriented function, such as 106a, may be used to iterate over a collection illustrated as building automation model 104 to compute, for example, a resulting value of all aggregated child view node objects 110 representing field devices, (such as 116b-116d), or to output a common value to all aggregated child node objects representing actuators or other types of field devices. Other use of data is contemplated including use of any number of semantic information units to determine the minimum, maximum, logical OR, logical AND, and any other mathematical function (such as determining an average, median, mean, mode, range, minimum, maximum, or performing any known mathematical function on the data by means of computation including but not limited to, addition, subtraction, multiplication, division, or any combination thereof).

FIG. 4 illustrates another functional block diagram of a building automation system 200 for controlling and/or monitoring inputs and outputs of field devices (or other points associated therewith) employed in a building based on a building automation model collectively implemented by building automation devices. The number of sensors or actuators used in a building automation system to sense or actuate one or more physical variables can vary. For example, one or more temperature sensors are used to measure a room temperature, and one or more valves are used to control heating and/or cooling equipment. The system illustrated in FIG. 4 provides a standardized representation of such multiply sensed and actuated valves, wherein each sensor an actuator is represented by an object, and a view node object aggregates the various objects together.

More particularly, and similar to that which is illustrated in FIG. 3, building automation system 200 includes one or more building automation devices 202. One or more of the one or more building automation devices 102 may include devices such as fan coil, as illustrated in FIG. 3. Referring again to FIG. 4, one of the one or more building automation devices 202 may control, interface with, or monitor devices by implementing a control program 206 for adjusting the temperature based in part on the average room temperature collected from one or more room temperature sensors that provide analog data 212a-212c. Building automation device 202 includes processing circuitry/logic configured to access and execute control program 206 that is stored in memory (such as random access memory, cache memory or other volatile memory storage device or computer readable media) or secondary storage (such as read only memory, non-volatile flash memory, hard drive, memory stick or other non-volatile memory storage device or computer readable media). Control program 206 may be a separate program or a program module of building automation device 202. Control program 206 may include an operating system (such as Linux or other conventional operating system).

Control program 206 instructs and interacts with a hierarchy of sensors, such as temperature sensors that provide analog data 212a-212c, throughout building automation model 204 represented as a plurality of view node objects configured in a hierarchal structure, such as one or more view node object parents 208 and one or more view node object children 210, to transmit and collect data to and from one or more field devices, including but not limited to sensors or actuators, that provide data (such as analog 212a-212c or digital) to compute a resulting value of all the aggregated view node objects 208, 210.

Building automation model 204 permits control program 206 to easily and efficiently add field devices, gather data from, and provide data to field devices (such as one or more room sensors, actuators, or combinations thereof), iterate though all field devices in the hierarchy, poll the field devices, evaluate the results, and react accordingly. No longer is the system taxed with determining how numerous field devices are related to a building automation device. Building automation model 204 is configured by technician to logically link any number of field devices of the technical building infrastructure to view node objects 208, 210 such that building automation device 202 can quickly, efficiently, and effectively communicate with said field devices.

Control program 206 is able to iterate though parent view node object 208 and any children view node objects 210 and the linked lists stored there within storing values, for example, temp, setpoint, command (including but not limited to fan speed command), demand, in the case of parent view node object 208 and one or more temperatures in the case of child view node object 210. Other configurations are contemplated and the inclusion of more or less semantic information units is contemplated. Additionally, the use of different automation devices is also contemplated.

Each of the items contained within view node item lists optionally may be logically linked to a hierarchy of one or more child view node objects which are optionally logically linked to one or more field devices (including but not limited to, room sensors, actuators, or combinations thereof). Still referring to FIG. 4, Temp located within view node object 208 is logically linked with view node object child 210, wherein each of its temperature data is logically linked with analog data received 212a-212c from one or more sensors (or any other type of field device logically linked to the system). Other configurations are contemplated and the inclusion of more or less semantic information units is contemplated. Additionally, the use of different automation devices and/or field devices is also contemplated.

FIG. 5 illustrates a method for a control program to iterate through a hierarchal building automation model 300 as may be implemented by an engineering tool that may be used to configure and commission a building automation model for implementation in building automation devices as illustrated. The system starts at block 302, and the control program is accessed from memory associated, in connection with, or residing within building automation device at block 304. At block 306 the parent view node object is accessed. At block 308 it is determined if the parent view node object has any children. If no, the process continues to block 324; if yes, the process continues to block 310. If yes, at block 310, the child view node object is accessed. At block 314 it is determined if there are any field devices yet to be polled (or, alternatively, yet to have data written to them). If yes, the process continues to block 316; if no, the process continues to block 324. If yes, at block 316, the child view node object accesses the field device, and at block 318 data is gathered (or alternatively written, or combination thereof). The data retrieved is then stored in the child node at block 320 and the data is passed to the parent node 322. The process then returns to block 306 determine if there are any additional child nodes to be accessed at block 308, and the process continues accordingly.

Once blocks 308 or 314 provide a "no" result, the process continues to block 324 to perform any computation (including but not limited to, determining the average of the temperature in the case of FIG. 4. In the case of FIG. 3, the average temperature can also be computed at the child view node object level.). The building automation device is altered as needed at block 326 (including but not limited to, it may have an actuator opened or the heat increased.) At block 328 the process ends.

Those of skill in the art will appreciate that embodiments not expressly illustrated herein may be practiced within the scope of the present discovery, including that features described herein for different embodiments may be combined with each other and/or with currently-known or future-developed technologies while remaining within the scope of the claims presented here. It is therefore intended that the foregoing detailed description be regarded as illustrative rather than limiting. It is understood that the following claims, including all equivalents, are intended to define the spirit and scope of this discovery. Furthermore, the advantages described above are not necessarily the only advantages of the discovery, and it is not necessarily expected that all of the described advantages will be achieved with every embodiment of the discovery.

What is claimed is:

1. A method for exchanging data between a control program and one or more building automation devices, the method comprising:

providing a building automation device in communication with a control program;

providing a building automation model comprising one or more parent view node objects and one or more child view node objects, wherein at least one of the one or more parent view node objects is logically linked to the building automation device and the one or more child view node objects, and wherein the one or more child view node objects are logically linked to one or more field devices, wherein a parent view node object of the one or more parent view node objects comprises a list of semantic information units, and wherein each of the semantic information units of the parent view node object is logically linked to a semantic information unit of the one or more child view node objects, respectively, with a common identifier identifying an automation function;

accessing, for a child view node object of the one or more child view node objects, a field device of the one or more field devices, the field device being logically linked to the child view node object;

gathering first data from the field device, the first data representing operation data or settings for the field device;

storing the gathered first data in the child view node object logically linked to the field device; and iterating through each of the parent view node objects and, as part of the iterating, reading second data stored within a logically linked list of semantic information units stored within the parent view node object, the second data representing operation commands, operation data, operation settings, or any combination thereof of the building automation device.

2. The method of claim 1, wherein the one or more field devices comprises a sensor or an actuator.

3. The method of claim 1, further comprising iterating through each of the one or more child view node objects and reading the first data stored within a logically linked list of semantic information units stored within the child view node object.

4. The method of claim 3, further comprising polling one or more field devices logically linked to the one or more child view node objects.

5. The method of claim 1, further comprising iterating through each of the one or more child view node objects and writing the first data to at least one of the semantic information units stored within the child view node object.

6. The method of claim 1, further comprising computing a mathematical function on an aggregate of the second data stored within a logically linked list of semantic information units stored within the one or more parent view node objects.

7. The method of claim 1, further comprising computing a mathematical function on an aggregate of the first data stored within a logically linked list of semantic information units stored within the one or more child view node objects.

8. The method of claim 1, wherein the parent view node object includes a node type, the node type being data describing a type of node.

9. The method of claim 1, wherein the logically linked list of semantic information units identifies an automation function provided in a room represented by the parent view node object.

10. A system for representing a hierarchal structure representing one or more building automation devices and one or more field devices, the system comprising:
a building automation model comprising a plurality of parent view node objects, a parent view node object of the plurality of parent view node objects being logically linked to a child view node object, wherein the parent view node object comprises a list of semantic information units, wherein one semantic information unit of the list of semantic information units is automatically logically linked to the child view node object with a common identifier identifying an automation function, and wherein the child view node object is logically linked to a field device; and
a processor in communication with the building automation model, the processor configured to:
access, for the child view node object, the field device, the field device being logically linked to the child view node object;
gather first data from the field device, the first data representing operation data or settings for the field device;
store the gathered first data in the child view node object logically linked to the field device; and
iterate through each parent view node object of the plurality of parent view node objects and, as part of the iteration, read second data stored within the list of semantic information units, the second data representing operation commands, operation data, operation settings, or any combination thereof.

11. The system of claim 10, wherein the child view node object comprises a list of semantic information units, wherein each of the semantic information units of the list of the child view node object is logically linked to a field device.

12. The system of claim 10, wherein the field device comprises a sensor or an actuator.

13. The system of claim 10, further comprising a building automation device logically linked to the parent view node object.

14. The system of claim 10, wherein the system further comprises a plurality of building automation devices, each building automation device of the plurality of building automation devices being logically linked to one parent view node object of the plurality of parent view node objects.

15. A non-transitory computer readable storage medium having stored therein data representing instructions executable by a programmed processor for iterating through a hierarchal structure representing one or more building automation devices and one or more field devices, the non-transitory computer readable storage medium comprising instructions for:
accessing a parent view node object of a plurality of parent view node objects;
determining if the parent view node object is logically linked to one or more child view node objects, the parent view node object being logically linked to the one or more child view node objects when one or more identifiers describing one or more automation functions included in the parent view node object match one or more identifiers included in the one or more child view node objects, respectively, wherein the parent view node object comprises a list of semantic information units logically linked to the one or more child view node objects, and wherein the one or more child view node objects comprises a list of semantic information units logically linked to one or more field objects;
iterating through each parent view node object of the plurality of parent view node objects and, as part of the iterating, reading first data stored within the logically linked list of semantic information units stored within the parent view node object, the first data representing operation commands, operation data, or operation settings;
accessing, when the parent view node object is logically linked to the one or more child view node objects, for a child view node object of the one or more child view node objects, a field device of the one or more field devices, the field device being logically linked to the child view node object;
gathering data from the field device, the data representing operation data or settings for the field device; and
storing the gathered data in the child view node object logically linked to the field device.

16. The non-transitory computer readable storage medium of claim 15, further comprising instructions for each of the child view node objects identified in the determining step, determining which of the one or more child view node objects is logically linked to one or more field devices.

17. The non-transitory computer readable storage medium of claim 16, further comprising instructions for:
for each of the field devices identified in the determining step of the child view node object:
accessing each of the field devices;
gathering the second data from each of the field devices; and
storing the second data in the child view node object logically linked to the field device.

18. The non-transitory computer readable storage medium of claim 17, further comprising instructions for passing the stored second data to the parent view node object.

19. The non-transitory computer readable storage medium of claim 18, further comprising instructions for altering a building automation device in response to the passed stored second data.

20. The non-transitory computer readable storage medium of claim 15, wherein the one or more field devices comprises a sensor or an actuator.

\* \* \* \* \*